May 21, 1929.　　　　F. WAITE　　　　1,714,061
PRINTING MACHINE
Filed Oct. 23, 1926　　　2 Sheets-Sheet 1
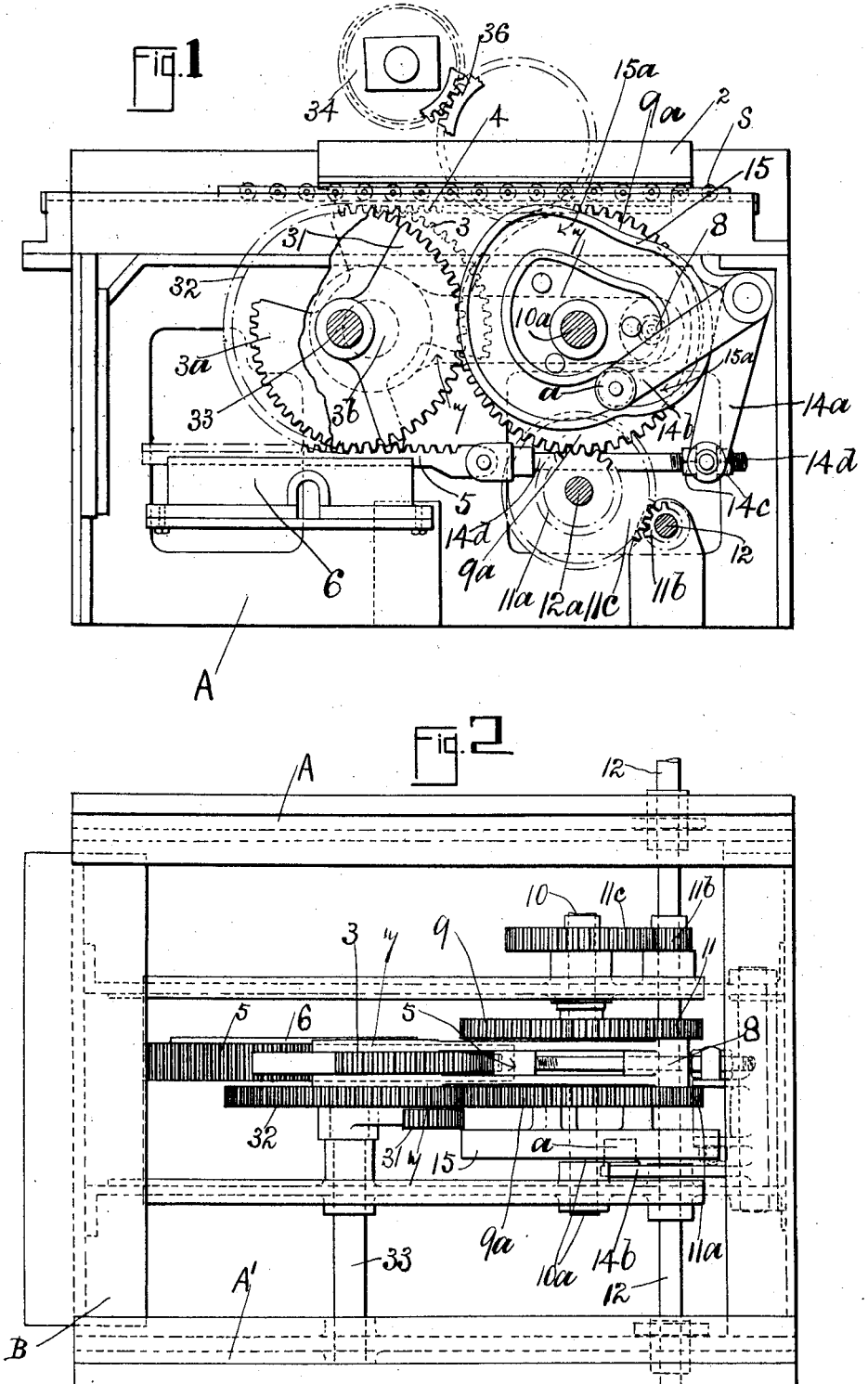

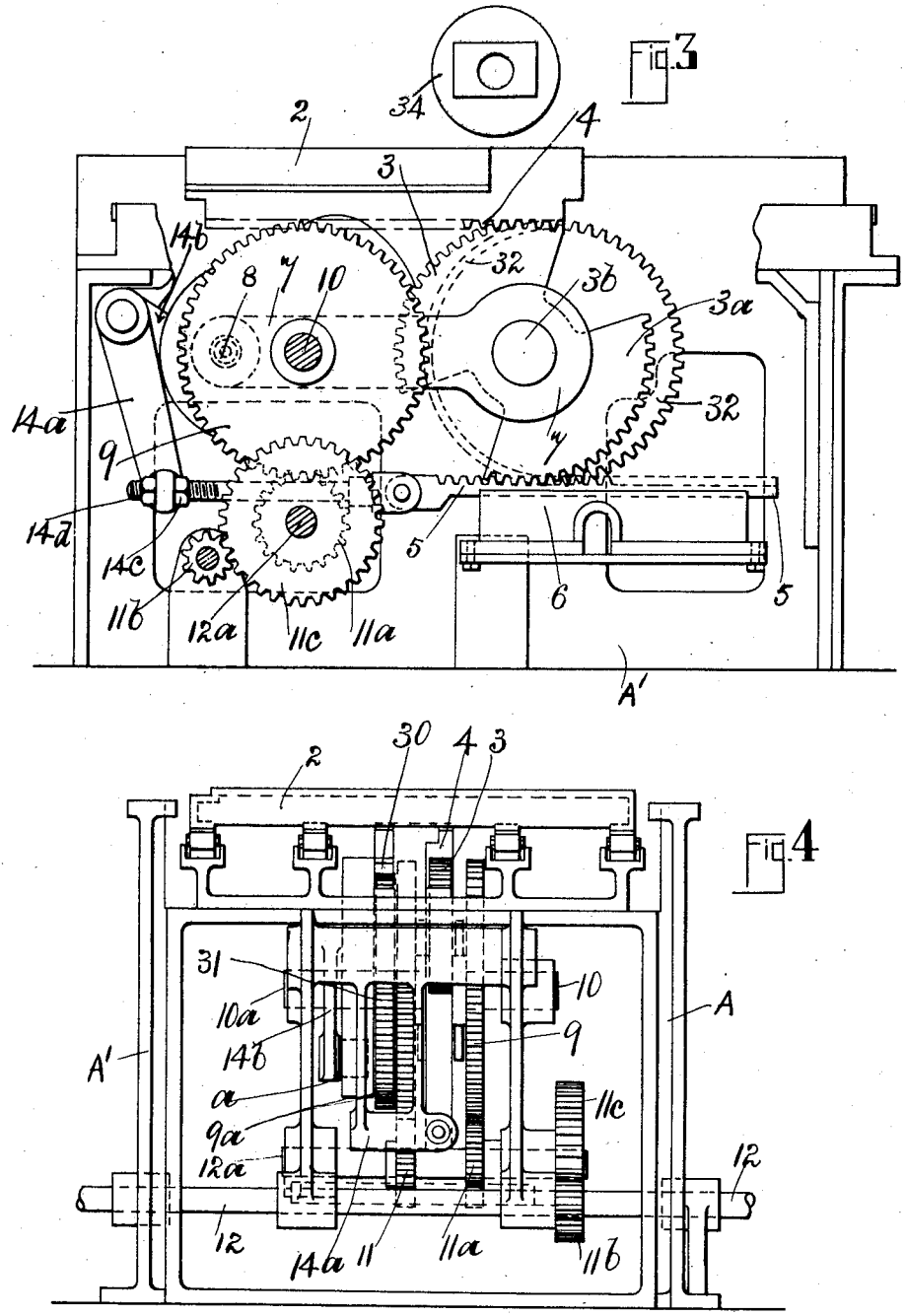

Patented May 21, 1929.

1,714,061

UNITED STATES PATENT OFFICE.

FRED WAITE, OF INGLEWOOD, ENGLAND.

PRINTING MACHINE.

Application filed October 23, 1926, Serial No. 143,619, and in Great Britain November 3, 1925.

My invention relates to that type or class of printing machine wherein a table is reciprocated by a crank actuating a gearing wheel that gears with a rack on the table above it and with another rack fixed upon the bed of the machine below it. In this type of machine the table is always moved through a space which is double the length of the diameter of the path in which the crank pin revolves. And in this type of machine the cylinder is geared so that its peripheral speed is always equal to and synchronizes with the speed of the table.

The object of my present invention is to make a printing machine table which is operated by a crank revolving continuously in a perfectly circular path around the centre of its rotation, synchronize with a continuously revolving cylinder during that part of its (said table's) stroke or movement when the actual printing impression is being carried out, and my said invention consists in the employment of cam mechanism for giving motion to the lower rack which has heretofore been fixed upon the bed of the machine, so that by moving this rack in one direction by my cam action I may increase the speed of the table while by moving it in the opposite direction I may retard or reduce the speed of the table and therefore I am enabled to control same and give to said table such a surface speed as will exactly agree or synchronize with the regular and even motion of the cylinder during the time the impression is made notwithstanding that the ordinary speed of the crank pin without interference would operate said table at an irregular speed.

By my invention I am able to operate the reciprocating table of a two revolution printing machine with a fixed centre crank pin and connecting rod.

In order that my said invention may be readily understood, I have hereunto appended sheets of drawings illustrative thereof, to which reference is made in the following description:—

Fig. 1 is a side sectional elevation of sufficient of a printing machine to show the application of my improved parts.

Fig. 2 is a sectional plan of the parts shown by Fig. 1.

Fig. 3 is a sectional side elevation of the parts shown by Fig. 1 but as seen from the opposite side of the machine.

Fig. 4 is an end elevation of the machine shown by Figs. 1 to 3 as seen in a direction looking from right to left of Fig. 1.

A—A¹ indicate two vertical members of the machine's framework and B the base piece by which they are supported.

In carrying my invention into effect according to the arrangement shown by Figs. 1 to 4 of the drawings the table 2 is mounted to slide over antifriction rollers $s$ supported by the members A—A¹ to be operated by a toothed gearing wheel or quadrant 3 engaging with a rack 4 fixed upon said table 2 while the other wheel or quadrant 3ª (the latter being shown in the drawings) engages with a rack 5 mounted to slide over bearings 6 forming part of the framework of the machine.

This duplex quadrant 3, 3ª has coupled to its axial pin 3ᵇ a connecting rod 7 which extends to take over and engage with a crank pin 8. Or instead of said axial pin 3ᵇ being directly engaged with by the connecting rod 7, I may arrange same to have its outer ends carried by two blocks mounted to slide upon the machine's framework, and have a separate pin carried by said blocks to be engaged with by the said connecting rod 7.

The crank pin 8 has each of its extremities fixed to the wheels 9 and 9ª and these wheels 9 and 9ª are fixed upon the cross shafts 10 and 10ª the said shafts 10 and 10ª being in perfect alignment with each other so that as the wheels 9 and 9ª revolve they carry the crank pin between them in such a manner that said crank pin is firmly supported throughout the whole of its rotary motions which are in a path that is perfectly circular.

The two shafts 10 and 10ª are caused to revolve by pinions 11, 11ª mounted upon the main driving shaft 12 transmitting motion to them through the intermediate gearing wheels 11ᵇ and 11ᶜ respectively and these shafts 10 and 10ª are supported by bearings on the framework A and A¹.

As is well known the motions of the crank pin 8 in its perfectly unvarying circular path would transmit varying motion to the quadrants 3 and 3ª and therefore to the table 2, that is to say in the ordinary manner provided the rack 5 was stationary the table 2 would be moved slowly at each end of its path and quickly in the middle part of its path. According to my invention I now arrange this rack 5 to be actuated by the arm 14ª of a lever 14 while the other arm 14ᵇ of this lever carries an antifriction bowl $a$ at its outer end to take into the groove $15^a$ of the cam 15. This cam 15 is fixed upon the shaft $10^a$ upon which the crank wheel $9^a$ is fixed so that the rotary motions of this cam 15 are in unison with the motions of the crank wheels 9 and $9^a$.

The reciprocating movements of the axial pin $3^b$ are effected in the usual manner by the rotary motions of the crank pin 8, so that provided the rack 5 was stationary the irregular motions of the table 2 would be as is usual in machines of the ordinary type. However, by arranging the rack 5 to slide under the control and by the actions of the cam slot $15^a$ in the cam 15 the motion of the table 2 may be controlled so that where same has to be decreased then the rack 5 will be operated by my said cam $15^a$ to slide in the same direction as the travelling of the axial pin $3^b$ by which arrangement I can make said cam give a soft or gradually decreasing and gradually increasing motion at the end of each stroke of the table notwithstanding that I may keep said stroke as short as possible.

By the employment of the devices above described during the time when the actual printing impressions are being carried out the speed of the table 2 is controlled as is stated while after such printing operations have been completed my cam mechanism, as actuated by the cam 15, may so effect the control of the movements of the table as to increase or decrease said movements as is found necessary.

When making use of the sliding rack 5 above described I preferably arrange same to slide over the bearings 6 by the intervention of rollers pivoted upon said rack while I further arrange such bearings 6 so that I may raise or lower them in order to adjust the rack 5 to keep in mesh with its wheel $3^a$. Further I make the connecting rod $14^d$ adjustable so that by the fixing nuts $14^e$ I can adjust the rack 5 in position relative to the cam 15 and quadrants $3^a$ and 3 as I may find desirable.

In order to provide for any wear or irregularity that may occur by the wearing or deteriorating of my cam or cam actuated devices above described I make use of an additional rack 30 which is fixed upon the table 2 so that the teeth of a segment wheel 31 may engage therewith just prior to the table 2 reaching its position where the printing impression is going to commence. The teeth of said segment wheel 31 and those of the rack 30 are sufficient in number and continue through a sufficient space to control, with the greatest accuracy, the motions of the table 2 during the period that the taking of the printed impression occupies. This segment wheel 31 is fixed upon a wheel 32 that is fixed upon the shaft 33 to which motion is transmitted in the usual manner by the wheel $9^a$ gearing with the said wheel 32. The wheel 9 gears with the usual wheel which through the wheel 36 transmits motion to the cylinder 34. By this arrangement of segment wheel mechanism I am enabled to secure accurate synchronization of the motions of the table and the cylinder during the period when the impression is being taken, whereas when said segment wheel by its continuing rotary motion has moved beyond the rack, the table 2 will commence its return motion under the control of the crank and cam actions which may transmit any regular or irregular motion thereto during the said return stroke of the crank.

Such being the nature and object of my said invention, what I claim is:—

1. In a printing machine, a reciprocating bed or table, a rack fixed upon said reciprocating table, a toothed quadrant engaging with said rack, an axial pin taking through said quadrant, a connecting-rod engaging said pin, a crank arranged to actuate said connecting-rod means for rotating the crank, another toothed quadrant rotating about the pin actuated by the crank, a rack with which said toothed quadrant is arranged to mesh, supports upon which said rack may slide, a connecting-rod and levers coupled to said sliding rack, a cam for actuating said levers in order to transmit motion to the sliding rack and means for rotating said cam.

2. In a printing machine, a reciprocating bed or table, a rack fixed to said reciprocating table, a wheel gearing with said rack, another rack mounted to slide upon framework beneath the wheel gearing with the other rack, said sliding rack engaging with the gearing wheel operating the other rack, a connecting-rod coupled so as to operate the wheels which gear with the racks, a crank for operating said connecting-rod, a cam mounted upon the crank-shaft, gearing wheels for transmitting motion to said crank-shaft, a lever actuated by the cam on the crank-shaft and adjustable connections for coupling the lever to the sliding rack.

3. In a printing machine, a reciprocating bed or table, a rack fixed to said reciprocating table, a wheel gearing with said rack, another rack mounted to slide upon the framework beneath said table, an adjustable member on which said rack slides, a gearing wheel engaging said rack, a connecting-rod coupled to so as to operate the wheels which gear with the racks, a crank for operating said connecting-rod, a cam mounted upon the crank-shaft, gearing wheels for transmitting motion to said crank-shaft, a lever actuated by said cam, connections from said lever to the rack which slides upon the framework, a gearing wheel mounted upon a shaft to mesh with the gearing wheel on the crank-shaft, a toothed quadrant fixed to said gearing wheel and a rack fixed upon the reciprocating table arranged to gear intermittently with the toothed quadrant.

4. In a printing machine, a reciprocating bed or table, a rack fixed to said reciprocating table, a wheel gearing with said rack, mounted to slide upon the framework beneath said table, supports for the member upon which the rack slides, a gearing wheel engaging with said sliding rack, a connecting-rod coupled so as to operate the wheels which mesh with the racks, a crank for operating said connecting-rod, a cam mounted upon the crank-shaft, gearing for transmitting motion to said crank-shaft, a lever actuated by said cam, adjustable connections for coupling the lever to the rack, a gearing wheel mounted upon a shaft to mesh with the gearing wheel on the crank-shaft, a toothed quadrant fixed to said gearing wheel, and a rack fixed upon the reciprocating table gearing with the toothed quadrant.

FRED WAITE.